May 19, 1942.  W. F. CUMISKEY  2,283,317
CYLINDER LINER
Filed May 31, 1939
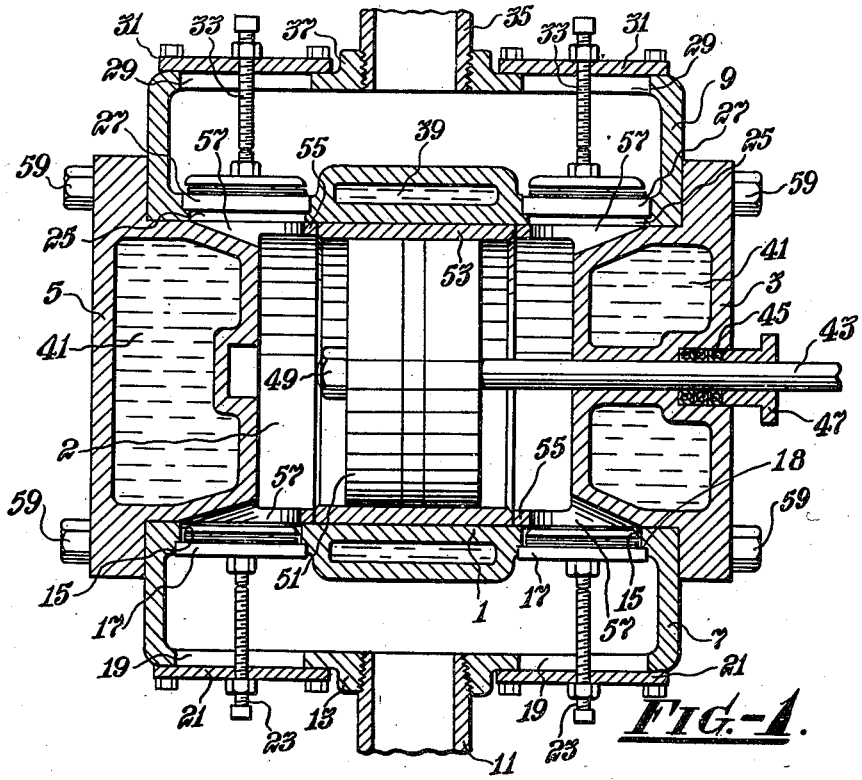
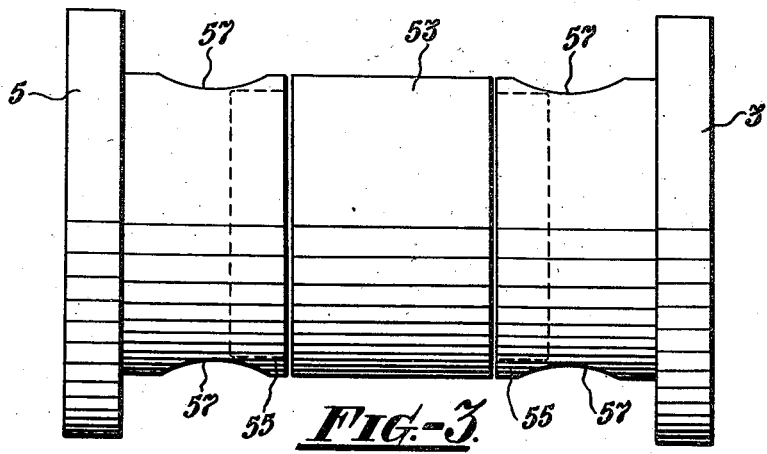
FIG.-2.  FIG.-3.  FIG.-4.
INVENTOR
William F. Cumiskey
BY
HIS ATTORNEY Patented May 19, 1942

2,283,317

UNITED STATES PATENT OFFICE 2,283,317

CYLINDER LINER

William F. Cumiskey, Painted Post, N. Y., assignor to Ingersoll-Rand Company, Jersey City, N. J., a corporation of New Jersey Application May 31, 1939, Serial No. 276,497

1 Claim. (Cl. 230—238)

This invention relates to a cylinder liner for a compressor or pump and, more particularly, to means for lining such a cylinder which may be easily installed and replaced.

The cylinders of a fluid compressor, for instance, are subjected to constant wear and, consequently, the cylinders must be rebored or replaced from time to time. Furthermore, in the event that corrosive fluids enter the cylinders the cylinder wall must either be formed of a material which will not corrode or the cylinder wall must be lined with such a material. It is therefore advantageous to employ liners for the cylinders which may be removed and replaced, if they become worn or corroded.

Ordinarily, when a compressor cylinder having ports at either end thereof for the inlet and discharge valves is to be lined, it is customary to form a single sleeve liner with portions thereof removed to accommodate the port openings. Great difficulty has been encountered in inserting such sleeves in the cylinder so that the ports would coincide with the openings in the sleeve.

Accordingly, it is an object of the present invention to provide a liner so arranged that the cylinder port openings will always coincide with the openings in the liner.

Another object is to provide a liner for a cylinder which may be easily inserted and removed.

A further object is to provide a cylinder liner which is efficient and requires no special tools or care in assembling.

These and other objects will be apparent from the following description of which the drawing forms a part and wherein the same numerals refer to similar parts.

In the drawing, Figure 1 is a view in section of a compressor cylinder embodying the present invention.

Figure 2 is an elevational view of the left hand cylinder head shown in Fig. 1.

Figure 3 is an elevational view of the central cylinder liner shown in Fig. 1.

Figure 4 is an elevational view of the right hand cylinder head of Fig. 1.

In Fig. 1, the cylinder wall 1 is closed at the right by the head 3 and at the left by the head 5 to form a compressor cylinder 2. An inlet manifold 7 surrounds a portion of the cylinder wall 1 at one side of the cylinder and the discharge manifold 9 is formed on the opposite side of the cylinder. Fluid to be compressed is led to the inlet manifold 7 by the conduit 11 which is threaded into the boss 13 formed as part of the inlet manifold 7. The wall 1 is provided with apertures 15 at either end of the cylinder adjacent the heads 3 and 5.

Communication between the cylinder 2 and the inlet manifold 7, through the ports 15, is controlled by the plate valves 17. The plate valves 17 will not be described here since they are of standard construction and are designed to open and admit fluid to the cylinder 2 whenever the pressure in the cylinder 2 is less than the pressure of the fluid in the inlet manifold 7. In order that the valve 17 may be inserted in the ports 15, the outer wall of the inlet manifold 7 has apertures 19 which are normally closed by plates 21 and have extending therethrough bolts or screws 23, threadedly engaging plates 21, which serve to hold valves 17 on their seats 18.

Adjacent the discharge manifold 9 the wall 1 has ports 25 similar to the ports 15. The valves 27 controlling these ports differ from valves 17 in that they are so mounted that they will open only when the pressure in the cylinder 2 exceeds the pressure in the discharge manifold 9. The valves 27 may be inserted in the ports 25 through the apertures 29 normally closed by plates 31 through which extend bolts or screws 33 corresponding in function to screws 23. In order to remove fluid from the discharge manifold, the pipe 35 threadedly engages the boss 37 formed as a part of the manifold wall 9. As shown here, the cylinder wall 1 is formed to provide a water jacket 39 and the heads 3 and 5 are also formed to provide water jackets 41.

A piston rod 43 extends through a suitable opening in the head 3 and leakage from the cylinder 2 along the piston rod 43 is prevented by the packing 45 maintained in place by the bushing 47. The end of the piston rod 43 is suitably secured as by nut 49 to the piston 51 adapted to reciprocate within the cylinder 2. Ordinarily, the piston 51 would move along the wall 1, but in this instance a liner sleeve 53 is provided. Of course, when a corrosive fluid is to be compressed, the liner sleeve must be of an alloy which is impervious to or can withstand the action of the corrosive fluid. It will be noted that liner sleeve 53, when inserted in the cylinder 2, is centrally located and its ends are adjacent to the edge of the ports 15 and 25 but do not coincide with the edges of the ports.

The heads 3 and 5 are provided with a cylindrical extension 55 with appropriate openings 57 to permit the ports 15 and 25 to open directly into the cylinder 2. The cylindrical portions 55 are formed integral with the heads 3 and 5 as here shown, or may be separately formed and secured to the heads.

It can thus be seen that it is a comparatively easy matter to insert the liner 1 in the cylinder 2 and secure heads 3 and 5 to the cylinder by bolts 59. With this arrangement, there is no necessity for turning the liner 53 in order that the ports 15 and 25 shall not be blocked by the sleeve. Furthermore, the openings 57 are so arranged with respect to the heads 3 and 5 that the openings 57 will always coincide with and open into the ports 15 and 25.

The piston will be guided by the liner 53 and all the wear will occur on this member. If excessive wear should occur, it is possible to replace the liner 53 which is a comparatively simple matter and it is unnecessary to replace the cylindrical extensions 55 on the heads 3 and 5.

I claim:

In a device of the character described, a cylinder having a piston therein, a discharge port in each end of the cylinder, an inlet port at each end of the cylinder, a head to close each end of the cylinder extending into the cylinder, a liner sleeve for the cylinder extending to points substantially adjacent the edges of said ports but not coinciding with the edges of said ports, coacting liner sleeves formed on each head extending within the cylinder to the first said liner sleeve, and ports in said coacting liner sleeves to coincide with said inlet and outlet ports.

WILLIAM F. CUMISKEY.